US008498577B2

(12) United States Patent
Achkar et al.

(10) Patent No.: US 8,498,577 B2
(45) Date of Patent: Jul. 30, 2013

(54) METHOD FOR MANAGING EVENTUAL INTERFERENCES DURING AN INFORMATION EXCHANGE BETWEEN TWO WIRELESS DEVICES BELONGING FOR EXAMPLE TO A MULTI-CARRIERS BASED UWB COMMUNICATION SYSTEM, AND CORRESPONDING DEVICE

(75) Inventors: Eric Achkar, Saint-Julien-en-Genevois (FR); Friedbert Berens, Geneva (DE)

(73) Assignee: STMicroelectronics N.V., Amsterdam (NL)

( * ) Notice: Subject to any disclaimer, the term of this patent is extended or adjusted under 35 U.S.C. 154(b) by 981 days.

(21) Appl. No.: 11/754,663

(22) Filed: May 29, 2007

(65) Prior Publication Data

US 2007/0281621 A1 Dec. 6, 2007

(30) Foreign Application Priority Data

Jun. 2, 2006 (EP) .................................. 06011970

(51) Int. Cl.
*H04B 1/06* (2006.01)
(52) U.S. Cl.
USPC ........................ 455/63.4; 375/130; 375/316
(58) Field of Classification Search
USPC .................. 455/63.4, 424, 425, 456.5, 456.6, 455/561, 550.1, 227.1, 227.2, 133, 562.1, 455/575.1, 129; 343/876; 348/725, 706
See application file for complete search history.

(56) References Cited

U.S. PATENT DOCUMENTS

| | | | | |
|---|---|---|---|---|
| 5,818,543 A * | 10/1998 | Lee | ............................... | 348/725 |
| 6,144,711 A * | 11/2000 | Raleigh et al. | ................ | 375/347 |
| 6,198,460 B1 * | 3/2001 | Brankovic | .................... | 343/879 |
| 6,370,182 B2 * | 4/2002 | Bierly et al. | .................. | 375/140 |
| 6,377,631 B1 * | 4/2002 | Raleigh | ......................... | 375/299 |
| 6,480,162 B2 * | 11/2002 | Sabet et al. | ..................... | 343/767 |
| 6,529,153 B1 * | 3/2003 | Dijkstra | .......................... | 342/20 |
| 6,560,209 B1 * | 5/2003 | Alamouti et al. | ............. | 370/330 |
| 6,608,607 B2 * | 8/2003 | Wu | .............................. | 343/909 |
| 6,621,454 B1 * | 9/2003 | Reudink et al. | ............... | 342/367 |
| 6,690,927 B1 * | 2/2004 | Hupp et al. | ................ | 455/277.1 |
| 6,714,769 B2 * | 3/2004 | Kazakevich et al. | ......... | 455/101 |
| 6,914,539 B2 * | 7/2005 | Hoctor et al. | ............ | 340/870.12 |
| 7,050,018 B2 * | 5/2006 | Weit | .............................. | 343/876 |
| 7,071,791 B1 * | 7/2006 | Wilson, III | .................... | 333/17.1 |
| 7,089,033 B2 * | 8/2006 | Leinonen et al. | .......... | 455/553.1 |
| 7,103,342 B2 * | 9/2006 | Kusbel et al. | ................. | 455/296 |
| 7,184,485 B2 * | 2/2007 | Balakrishnan et al. | ....... | 375/260 |
| 7,236,065 B2 * | 6/2007 | Hyvonen | ...................... | 333/101 |
| 7,260,360 B2 * | 8/2007 | Seo et al. | ..................... | 455/41.2 |

(Continued)

FOREIGN PATENT DOCUMENTS

| | | |
|---|---|---|
| EP | 1542420 | 6/2005 |
| JP | 11-088246 | 3/1999 |

(Continued)

*Primary Examiner* — Hai Nguyen

(74) *Attorney, Agent, or Firm* — Allen, Dyer, Doppelt, Milbrath & Gilchrist, P.A.

(57) ABSTRACT

A device belonging to a wireless communication system and adapted to exchange information with another device of the system within a main band of frequencies includes N different antennas having respectively different antenna characteristics, with N being greater than one. A controllable selector selects one of the antennas. A detector detects through the selected antenna the eventual presence of at least one interferer operating within the main band of frequencies. A controller, upon presence of a detected interferer, controls the selector for selecting another antenna.

23 Claims, 6 Drawing Sheets

U.S. PATENT DOCUMENTS

| | | | |
|---|---|---|---|
| 7,263,333 B2 * | 8/2007 | Roberts | 455/67.13 |
| 7,372,890 B2 * | 5/2008 | Batra et al. | 375/130 |
| 7,567,786 B2 * | 7/2009 | Bjerede | 455/196.1 |
| 7,653,020 B2 * | 1/2010 | Roberts | 370/318 |
| 7,764,725 B2 * | 7/2010 | Birru | 375/140 |
| 7,792,513 B2 * | 9/2010 | Safarian et al. | 455/296 |
| 7,796,956 B2 * | 9/2010 | Khayrallah et al. | 455/75 |
| 7,822,430 B2 * | 10/2010 | Yoon et al. | 455/512 |
| 7,899,407 B2 * | 3/2011 | Rofougaran | 455/73 |
| 8,000,649 B2 * | 8/2011 | Shiff et al. | 455/11.1 |
| 8,107,557 B2 * | 1/2012 | Lindenmeier et al. | 375/316 |
| 8,208,373 B2 * | 6/2012 | Bonta et al. | 370/228 |
| 8,244,202 B2 * | 8/2012 | Kitayabu | 455/344 |
| 8,314,653 B1 * | 11/2012 | Granger-Jones et al. | 327/553 |
| 2002/0032403 A1 * | 3/2002 | Savagle et al. | 604/28 |
| 2004/0264362 A1 * | 12/2004 | Rhodes | 370/208 |
| 2005/0129155 A1 * | 6/2005 | Hoshino | 375/347 |
| 2005/0163042 A1 * | 7/2005 | Roberts | 370/208 |
| 2005/0164642 A1 * | 7/2005 | Roberts | 455/67.13 |
| 2005/0255878 A1 * | 11/2005 | Leinonen et al. | 455/552.1 |
| 2006/0171445 A1 * | 8/2006 | Batra et al. | 375/130 |
| 2007/0153729 A1 * | 7/2007 | Alapuranen | 370/329 |
| 2007/0177653 A1 * | 8/2007 | Bjerede | 375/130 |
| 2007/0281621 A1 * | 12/2007 | Achkar et al. | 455/63.4 |
| 2008/0045175 A1 * | 2/2008 | Yoon et al. | 455/188.1 |
| 2008/0212582 A1 * | 9/2008 | Zwart et al. | 370/390 |
| 2011/0033000 A1 * | 2/2011 | Berens et al. | 375/260 |
| 2011/0228833 A1 * | 9/2011 | Saitou | 375/224 |

FOREIGN PATENT DOCUMENTS

| | | | |
|---|---|---|---|
| JP | 200233688 | * | 1/2002 |
| JP | 2005-348454 | | 12/2005 |
| JP | 2006115318 | | 4/2006 |
| WO | 01/41330 | | 6/2001 |
| WO | 2005/006698 | | 1/2005 |
| WO | 2005/027372 | | 3/2005 |

* cited by examiner

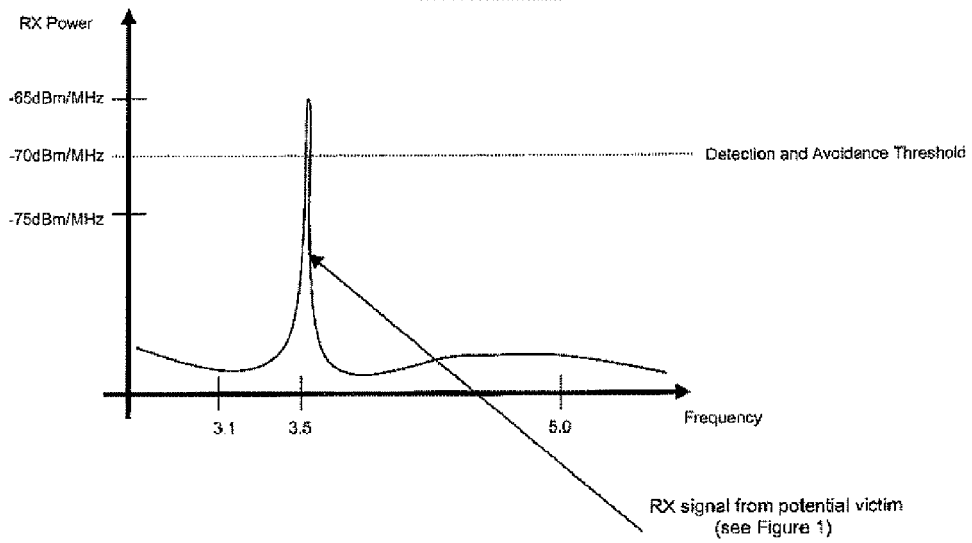
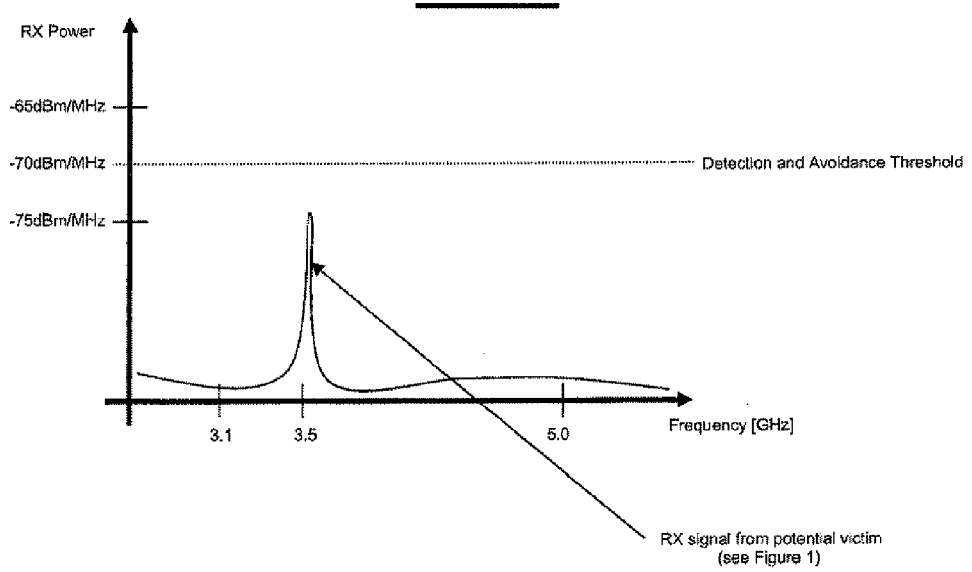

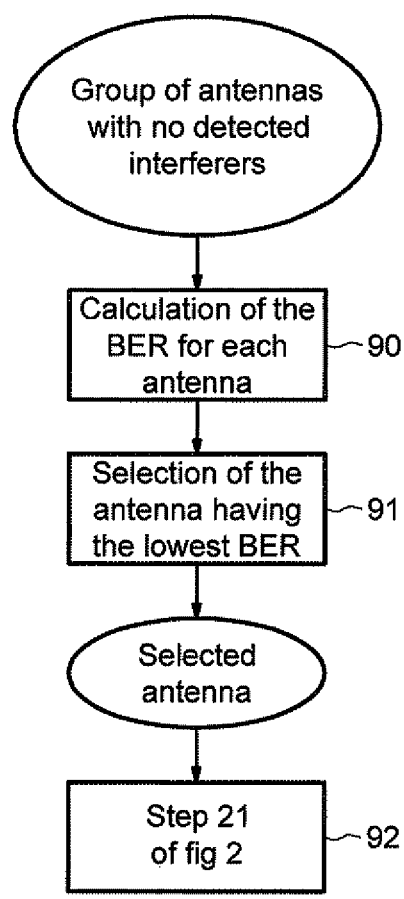

METHOD FOR MANAGING EVENTUAL INTERFERENCES DURING AN INFORMATION EXCHANGE BETWEEN TWO WIRELESS DEVICES BELONGING FOR EXAMPLE TO A MULTI-CARRIERS BASED UWB COMMUNICATION SYSTEM, AND CORRESPONDING DEVICE

FIELD OF THE INVENTION

The present invention relates to wireless communication systems, and more particularly, to the processing of interferences within different wireless communication apparatuses or devices, such as devices operating in an ultra wide band (UWB) communication system.

BACKGROUND OF THE INVENTION

The main characteristic of a UWB based wireless communication system is the fact that it operates as an underlay system in frequency bands already in use by other wireless communication and location systems, such as RADAR. These systems will generate interference in UWB systems (in band interference), and the UWB system will generate interference towards these systems. Due to the very limited transmission power of the UWB systems, the range in which the generated interference will cause a degradation in the system is limited to some meters or a few tenths of a meter. A system operating in this area will also generate interference towards the UWB system in operation. This leads to a degradation of the communication performance.

Devices may operate according to the Ultra Wide Band (UWB) standard based on Orthogonal Frequency-Division Multiplexing (OFDM), called Multiband OFDM Alliance (MBOA). These devices can generate interferences toward a Worldwide Interoperability for Microwave Access (WIMAX) device.

OFDM is a method of digital modulation in which a signal is split into several narrowband channels (sub-carriers) at different frequencies. A WIMAX device operates, for example, with a bandwidth of 20 MHz at a central frequency of 3.5 GHz, whereas the frequency band of the MBOA system lies between 3.1 and 5.0 GHz.

Wireless personal area networks based on OFDM and UWB technologies like the MBOA standard will directly interfere with narrowband interferers which are close to such wide band devices. At present, no specific interference mitigation techniques are implemented in the UWB standard based on OFDM (MBOA).

To avoid in band spectral interference, WO 2005/006698 (INTEL) proposes to puncture, i.e., remove, selected sub-carriers. More precisely, this puncturing is made after the OFDM modulation in the transmitter while taking into account channel knowledge. Depuncturing is performed in the receiver before the OFDM demodulator. However, such a band dropping approach leads to a reduction in available bandwidth.

SUMMARY OF THE INVENTION

In view of the foregoing background, an object of the present invention is to manage the interference from a wireless device, such as a UWB device, towards a device as well as the interference generated by the device towards the wireless device without a reduction in the available bandwidth, and without resources reduction as in the band dropping approach.

This and other objects, advantages and features in accordance with the present invention are provided by a method for managing eventual interferences during an information exchange between two main wireless devices, such as devices belonging to a multi-carrier based UWB communication system, for example. The information may be exchanged within a main band of frequencies, such as on sub-carriers having frequencies belonging to the main band of frequencies, for example. The method may comprise providing each wireless device with several different antennas having respectively different antenna characteristics and performing the following:

a) selecting one antenna for performing the information exchange;

b) detecting through the selected antenna the eventual presence of at least one interferer operating within the main band of frequencies; and if the at least one interferer is detected, selecting another antenna for continuing the information exchange.

In contrast to the prior art approaches, the present method addresses the problem from the antenna side. By using an appropriate antenna selection, the interference towards the device is reduced. This also reduces the interference generated by this device towards the wireless device.

For example, a switch may be added between the antenna input and the radio frequency part of a UWB device. No additional radio frequency processing stages are needed. For example, a small additional control unit may only need to be added in the baseband stage together with an external control signal for the switching operation. For example, the control unit itself may be implemented in software using the existing baseband control processor.

Since this aspect includes an antenna technique, the potential of blocking can be significantly reduced. This is not possible with a baseband approach using either notching or band dropping.

Generally speaking, the minimum required number of antennas having different antenna characteristics may be equal to two, although more than two antennas can be used. If one interferer is detected through one selected antenna, there is a higher probability that the power level of this interferer when another antenna is selected becomes lower than a given detection and avoidance threshold (for example, −70 dBm/MHz for a UWB application).

In particular, when more than two antennas are used, it is advantageous to repeat steps b) and c) for each newly selected antenna, and finally selecting one antenna.

It is possible that more than one interferer exists in the vicinity of the main wireless device. Thus, by scanning the environment of the main wireless device, it is possible to determine at least one antenna through which no interferer is detected.

However, it is also possible that in a worst case, all the antennas detect an interferer. In such a case, a control layer, for example the MAC layer, may decide to stop the information exchange between the two UWB devices. Another possibility includes selecting the antenna through which the interferer level is the lowest, and using another approach for minimizing interferences, such as a band dropping approach as conventionally used in the prior art.

The method may further comprise detecting a group of antennas through which no interferer is detected, determining for each antenna of the group an indication representative of the quality of the information exchange, and selecting the antenna associated to the best quality of the information exchange for continuing the information exchange.

An indication representative of the quality of the information exchange may be the Bit Error Rate (BER) or a determination of a Signal to Noise Ratio (SNR), for example. Thus, without the existence of a potential victim, and thus interfering device, this embodiment can in particular be used to optimize or increase the communication performance in the UWB system. In other words, the best antenna configuration can be used for the communication.

Many possibilities exist concerning the different antenna characteristics. For example, the antenna characteristics used for differentiating the antennas may comprise the antenna radiation pattern. Another characteristic which can be used may comprise the antenna polarization. Other antenna characteristics which can be used may comprise the antenna orientation and/or localization of the main device. Of course, it is also possible to use a combination of at least two of these characteristics to differentiate antennas.

Each main device may belong to an OFDM based UWB communication system or to a Direct Sequence UWB (DS-UWB) communication system, for example.

Another aspect is directed to a wireless device belonging to a wireless communication system, such as a multi-carrier based UWB communication system, for example. The wireless device may be adapted to exchange information with another device of the system within a main band of frequencies, for example, on sub-carriers having frequencies belonging to the main band of frequencies.

The wireless device may comprise N different antennas having respectively different antenna characteristics, with N being greater than one. Controllable selecting means or a controllable selector may be adapted to select one antenna. Detection means or a detector may be adapted to detect through the selected antenna the eventual presence of at least one interferer operating within the main band of frequencies. Control means or a controller may be adapted upon presence of a detected interferer to control the selecting means for selecting another antenna.

The device may comprise a transmission chain and a reception chain, and the controllable selecting means may comprise controllable switching means or a controllable switch having N switching states respectively associated to the N antennas. The controllable switching means may be configured in one of the N states upon reception of a control signal for actually connecting the corresponding antenna with the transmission and reception chains. The control means may be adapted to deliver the control signal to the switching means.

The detection means may advantageously detect an interferer through each newly selected antenna, and the control means may finally select one antenna. The device may further comprise processing means or a processor to detect a group of antennas through which no interferer is detected, and to determine for each antenna of the group an indication representative of the quality of the information exchange. The control means may be adapted to control the selecting means for selecting the antenna associated to the best quality of the information exchange.

BRIEF DESCRIPTION OF THE DRAWINGS

Other advantages and features of the invention will appear on examining the detailed description of embodiments, these being in no way limiting, and of the appended drawings in which:

FIGS. 4 and 5 are graphs illustrating different approaches for detecting an eventual interferer according to the present invention;

FIG. 9 is a flow chart related to another embodiment of the method according to the present invention.

DETAILED DESCRIPTION OF THE PREFERRED EMBODIMENTS

Figure 1:
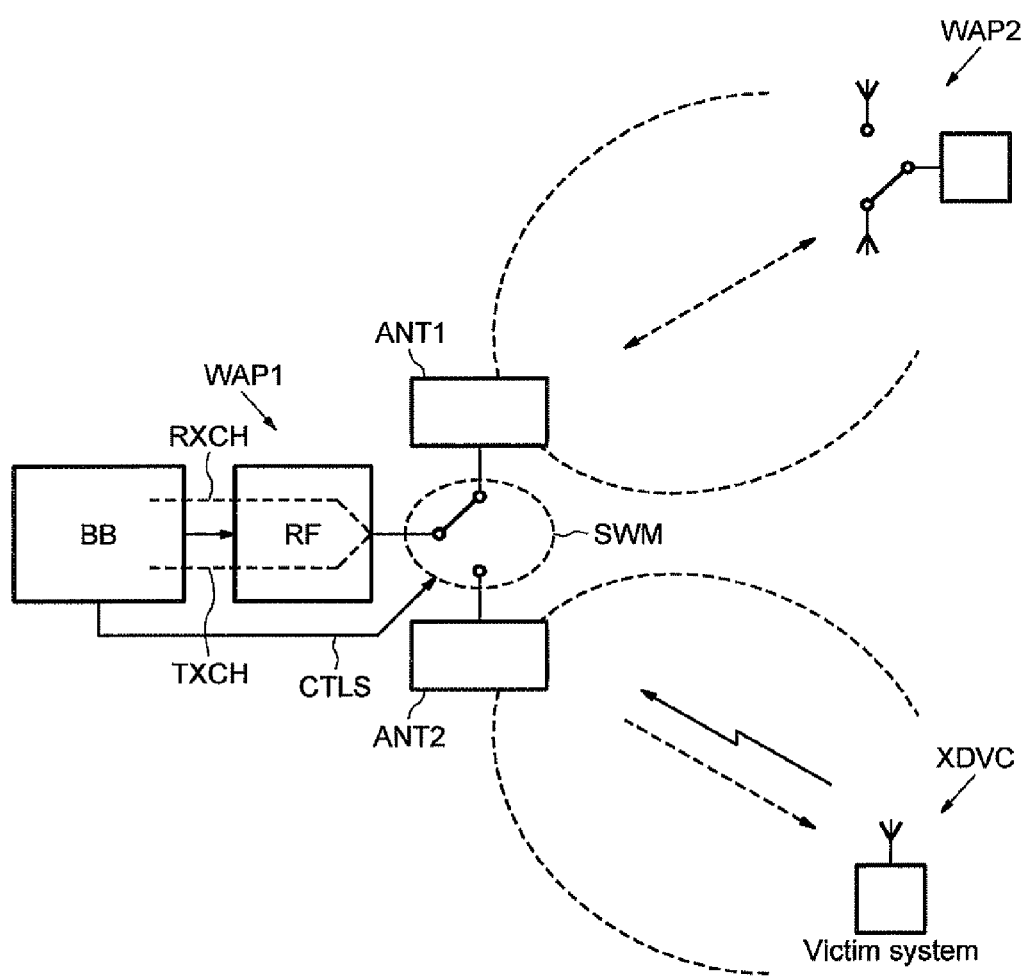
FIG. 1 is a block diagram of an embodiment according to the present invention.

FIG. 1 discloses an example of a wireless communication device WAP1 belonging to a non-coordinated communication system such as a WLAN (Wireless Local Area Network) or a WPAN (Wireless Personal Area Network).

Such a wireless device WAP1 belongs to an OFDM based Ultra Wide Band Communication system for example. However, the invention is not limited to such an example and can apply also to coordinated wireless systems like mobile radio systems or WIMAX systems or a WLAN in a coordinated mode using an access point. More generally, the invention may be directed to different types of wireless systems, including CDMA and GSM systems or generalized multi-carrier (GMC) systems in which the carriers are not necessarily orthogonal.

WPAN MAC protocols have a distributed nature where there is no central coordinator terminal or base station to assign the medium access. There, in contrast to a mobile radio terminal, a WPAN transceiver has a much higher flexibility to allocate the transmission slot and formats. The allocation of the communication resources is a distributed process. The allocation to a specific time slot in the super frame can be modified from one super frame to the next. The controlling entity is the WPAN-MAC layer of the communicating terminals. The allocation is based on the requested data rate and the type of service to be transmitted. Furthermore, the available resources are taken into account in the allocation process. The MAC layer requests a reservation for a specific time slot or a number of time slots based on these constraints. These constraints can be split into local constraints, like the data rate to be transmitted or received and network wide constraints like the already existing slot reservation.

An example of distributed WPAN-MAC is MBOA MAC. The proposed MBOA MAC standard draft is based on a UWB technology and is planned to be used in the frequency band between 3.1 and 10.7 GHz. First implementations using the standard work in the frequency range between 3.1 GHz and 5.0 GHz.

The wireless device WAP1 comprises conventionally an OFDM based UWB communication interface connected between an UWB application block and the air channel. This communication interface comprises a UWB MAC layer clocked by a clock signal, and connected to a PHY layer and to the UWB application block.

For further details concerning the MAC layer and the PHY layer of the communication interface, reference is directed to the High Rate Ultra Wideband PHY and MAC Standard, Standard ECMA-368, $1^{st}$ edition, December 2005, and to the MAC-PHY Interface for ECMA-368, Standard ECMA-369, $1^{st}$ edition, December 2005.

The MAC layer manages in particular the emission/reception of the UWB data stream and is incorporated by software in a control processor BB. The wireless device WAP1 may comprise also conventionally a transmission chain TXCH and a reception chain RXCH. Both chains are connected to the several different antennas (here, two antennas) ANT1 and ANT2 through controllable switching means SWM, as it will be explained more in greater detail below.

In a conventional manner, the transmission chain comprises an outer transmission block including an encoder, for example a convolutional encoder, receiving data from source coding means and delivering a bits stream to puncturing means which delivers a punctured bits stream.

The other conventional means of the transmission chain are interleaving means followed by mapping means which map the bits into symbols according to a modulation mapping scheme depending on the kind of used modulation, such as a BPSK modulation or more generally a QAM modulation, for example. The symbols are then delivered to an OFDM modulator which performs IFFT processing to associate each symbol to a sub-carrier and to form OFDM symbols. Each sub-carrier is modulated in accordance with the value of the corresponding symbol.

The mapping means as well as the OFDM modulator belong to an inner transmission block of the transmission chain. The OFDM symbols delivered by the base band control processor BB are then processed in a conventional radio frequency stage RF before being transmitted via the air through one selected antenna ANT1 or ANT2.

In a conventional manner, the reception chain RXCH comprises means corresponding to the means of the transmission chain for performing inverse operations with respect to the operations performed by the means of the transmission chain. The UWB device WAP1 exchanges information with another UWB device WAP2 of the communication system. The UWB device WAP2 has a structure analogous to the structure of the device WAP1.

The main band of frequencies used for the operation (transmission and/or reception) of the main devices WAP1 and WAP2 lies between 3.1 GHz and 4.9 GHz. Further, the main frequency band is subdivided into three sub-bands called hopping sub-bands, which are mutually spaced. The allocation of the sub-bands during the transmission is made according to a predetermined hopping sequence.

In the lower part of FIG. 1, a narrow band device (auxiliary device) or interferer XDVC is assumed to operate in an auxiliary band of frequencies included within the main band of frequencies within the second sub-band, for example. This auxiliary band of frequencies has a width of 20 MHz, for example.

Compared to a UWB device based on techniques like the MBOA standard, such a device XDVC is considered as being a narrowband device. As an example, a 20 MHz narrow band carrier which can be the width of the auxiliary band of the auxiliary device (e.g., the WIMAX device), corresponds to only 1.3% of the used UWB spectrum of a MBOA based device, and corresponds to an interfering sub-carrier group of 5 or 7 sub-carriers, for example.

The auxiliary device or interferer may belong to a fix wireless system (FWA, fixed wireless access) like a WIMAX system. However, it is also possible that such an auxiliary device belongs to a mobile radio system defined by a mobile radio standard like UNTS, GSM, CDMA, EDGE, beyond IMT-2000 systems, or to a fixed satellite system (ESS). The mobile radio system may also be a radar system used in radio navigation if the frequency band of the mobile radio system or the satellite system or the radar system is located within the main frequency band of the main device, for example.

Figure 3:
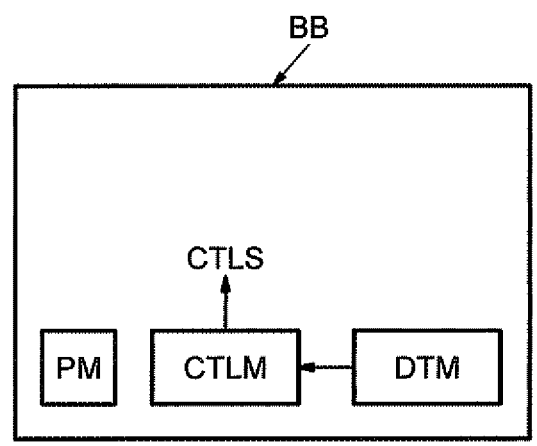
FIG. 3 is a block diagram illustrating in greater detail a main device according to the present invention.

Referring again to FIG. 1, the two antennas ANT1 and ANT2 are connected to the controllable switching means SWM. The switching means is controlled by a control signal CTLS delivered by control means CTLM which can be realized by software within the base band processor BB (FIG. 3).

The output of the switching means is connected to the RF front N part of the UWB device WAP1. The switching means may be realized by any means known, such as by using a conventional GaAs switch including controllable MOS transistors or a RF-MEMS (Radio-Frequency Micro-Electro-Mechanical System) switch, for example.

The two antennas ANT1 and ANT2 have different beam characteristics, for example. The antennas could be implemented on the same substrate (e.g., IPAD) or the antennas could be positioned in different corners of a PDA or PC (non-integrated antennas systems).

In the situation presented in FIG. 1, an interfering device XDVC is operating in the close vicinity of the UWB system. Here, it is positioned in the beam of antenna ANT2. Thus, the interference level generated by the interfering device in the UWB device WAP1 and thus the interference generated by the device WAP1 into the victim receiver XDVC, will have a higher level if antenna ANT2 is used compared to the deployment of antenna ANT1.

This situation is depicted in FIGS. 4 and 5. In FIG. 4, corresponding to a selection of antenna ANT2, the detection threshold defined as −70 dBm/MHz in the UWB device WAP1 is exceeded. In the case where antenna ANT1 is used, the threshold is not reached, and thus the UWB system can operate without restrictions (FIG. 5). Thus, in the present case, antenna ANT1 is selected. Furthermore, the use of antenna ANT1 will significantly reduce the interference generated by the interferer XDVC towards the UWB communication link.

Figure 2:
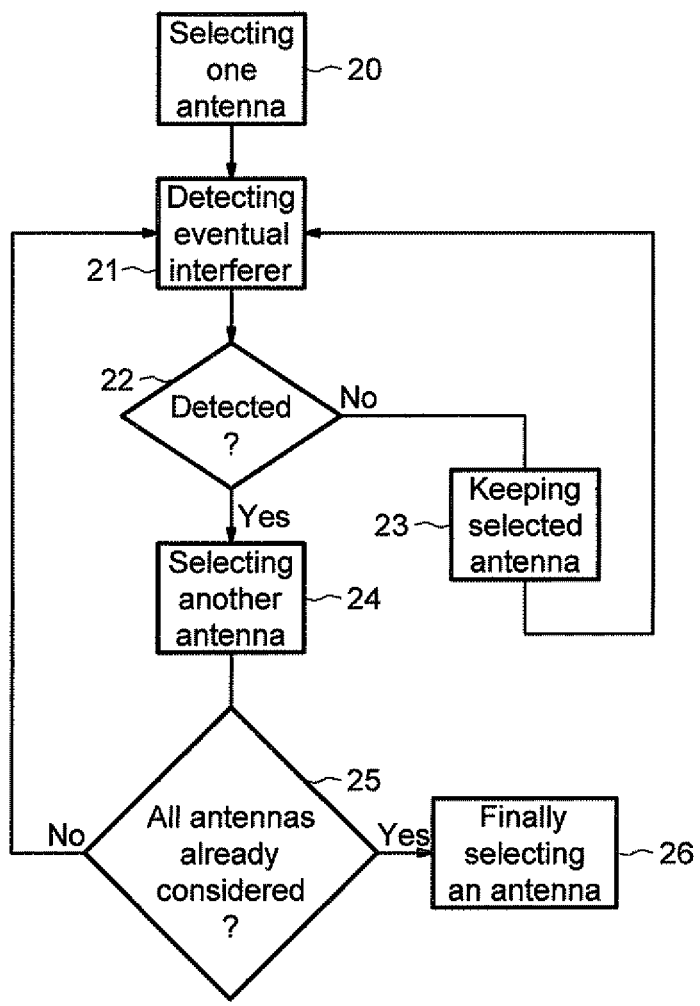
FIG. 2 is a flow chart of a method according to the present invention.

The additional gain due to the limited interference as a directional gain of the antenna will easily compensate for the additional loss introduced by the switching means SWM. More generally, as illustrated in FIG. 2, a first antenna is selected (step 20) for the information exchange between the two UWB devices WAP1 and WAP2.

An eventual interferer is detected (step 21), through the selected antenna. Several known and conventional approaches are possible for detecting such an eventual interferer.

One approach includes evaluating the SNRS on the different sub-carriers, and based on a comparison between the average values with the peak values, interfered carriers can be identified.

Another approach includes measuring the energy on all the sub-carriers, then averaging this energy and detecting whether or not the energy of one or several sub-carriers exceeds a threshold above this mean value.

Yet another approach is based on the estimation of the variance of the channel estimation. Such detections can be made by detection means DTM realized by a software module in the base band processor BE or by a specific integrated circuit, for example. The detection means can be implemented using the FFT (Fast Fourier Transform) means available in a conventional base UWB device.

If no interferer is detected (step 22), the selected antenna is kept (step 23). Then, step 21 is regularly performed for detecting eventual new interferer. If at step 22, an eventual interferer is detected, then another antenna is selected (step 24). Assuming that such a newly selected antenna has not been previously selected, the selection of this antenna is confirmed and step 21 is again regularly performed for this newly selected antenna.

If another interferer or the same interferer is still detected through this newly selected antenna, then another antenna, if any, is again selected (step 24). Assuming now that regardless of the antenna selected, an interferer is still detected, thus, a decision has to be taken by the base band processor, for example by the MAC layer.

The decision includes, for example, in stopping any information exchange between the two UWB devices for a certain duration, and to determine regularly whether or not the information exchange can be continued through at least one antenna. Another possibility is to finally select an antenna (step 26), such as the antenna for which the interferer level is the lowest, and to continue the information exchange with this antenna.

Figure 6:
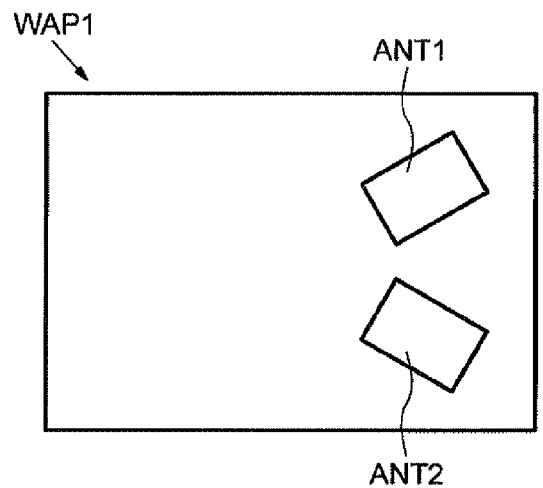
FIGS. 6, 7 and 8 illustrate different antenna characteristics according to the present invention.
Figure 7:
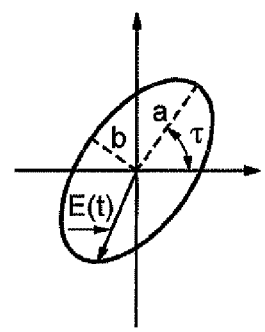
Figure 8:
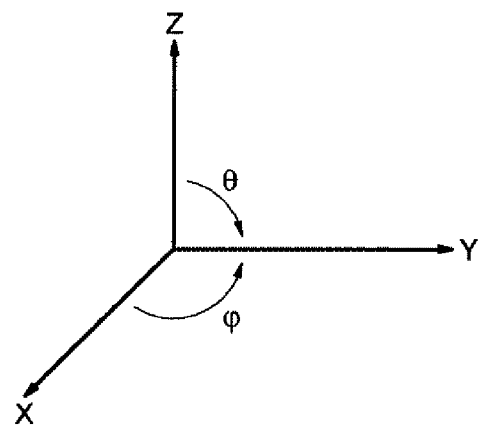

As mentioned above, the several antennas have different antenna characteristics. FIGS. 6 to 8 illustrate different approaches for providing the antennas with respective different antenna characteristics. As readily known by those skilled in the art, the radiation field from a transmitting antenna is characterized by the complex Pointing vector E×H*, in which E is the electric field and H is the magnetic field.

Polarization is the property of the electric field vector that defines the variation in direction and magnitude with time. If the field is observed in a plane perpendicular to the direction of propagation at a fixed location in space, the end point of the vector representing the instantaneous electric field magnitude traces a curve.

In the general case, this curve is an ellipse as shown in FIG. 7. The ellipse is characterized by the axial ratio, the ratio of the major and minor axes, and the ellipse major axis tilt angle τ. The polarization may be classified as linear, circular or elliptical according to the shape of the curve. Linear and circular polarizations are special cases of elliptical polarization, when the ellipse becomes a straight line or a circle, respectively. Thus, the antennas may be differentiated by polarization.

Another possibility is to use an antenna with a horizontal polarization and another antenna with a vertical polarization. Yet another characteristic which permits one to distinguish an antenna from another antenna is the radiation pattern.

The antenna radiation pattern is the mapping of the radiation levels of the antenna as a function of the spherical coordinates (θ, φ) as illustrated in FIG. 8. In most cases, the radiation pattern is determined in the far-field region for constant radial distance and frequency. A typical radiation pattern is characterized by a main beam and a series of side lobes at different levels. The antenna performance is often described in terms of its principal E- and H-plain patterns.

Another possibility for distinguishing one antenna from another is its location and/or orientation on the device, as illustrated for example in FIG. 6. Of course, the antennas may be differentiated from one another by using a combination of at least two of these different characteristics.

Although two antennas are the minimum number of antennas for performing this embodiment of the invention, it is possible to use four to six antennas for an UWB application in which the range of frequencies is less than 10 GHz. These antennas may be localized on a circle, for example.

Without the existence of a potential victim, and thus an interfering device within a group of antennas or within all the antennas, the invention can be used to optimize the communication performance in the UWB system. Such an embodiment is illustrated in FIG. 9. For example, if no interferences are detected within a group of antennas or within all the antennas, criteria for an information exchange quality can be determined, for example the bit error rate BER (step 90). The control means may select the antenna leading to the lowest BER (step 91).

Such a group of antennas can be detected by processing means PM (for example, a software module included in the base band processor) based on an indication given by the detection means. Of course once an antenna has been selected, the detection of an eventual interferer is periodically performed (step 92), as explained with reference to FIG. 2, such as every 30 seconds, for example.

That which is claimed:

1. A method for managing interferences during an information exchange between two wireless devices operating in a wireless communication system, the information being exchanged within a main band of frequencies, the method comprising:

providing each wireless device with a plurality of antennas having respectively different antenna characteristics, and each wireless device performing the following selecting one antenna for performing the information exchange;

detecting through the selected antenna at least one interferer operating within the main band of frequencies; and selecting another antenna for continuing the information exchange based on detecting the at least one interferer, the selecting comprising determining at least a portion of the plurality of antennas in which no interferer is detected, determining for each antenna in the at least a portion of the plurality of antennas a bit error rate that is representative of a quality of the information exchange, and selecting one of the antennas based on the determined bit error rates for continuing the information exchange.

2. A method according to claim 1, wherein the antenna characteristics comprise different antenna radiation patterns.

3. A method according to claim 1, wherein the antenna characteristics comprise different antenna polarizations.

4. A method according to claim 1, wherein the antenna characteristics comprise at least one of different antenna orientations and localization on each wireless device.

5. A method according to claim 1, wherein the wireless communication system comprises an ultra wide band (UWB) communication system; and wherein each wireless device comprises a UWB wireless device.

6. A method according to claim 5, wherein each UWB wireless device comprises an orthogonal frequency-division multiplexing (OFDM) based UWB communication system.

7. A method according to claim 1, wherein the wireless communication system comprises a direct sequence ultra wide band (DS-UWB) communication system; and wherein each wireless device comprises a DS-UWB wireless device.

8. A wireless device for operating in a wireless communication system for exchanging information with other wireless devices operating therein, the information being exchanged within a main band of frequencies, the wireless device comprising:

N antennas having respectively different antenna characteristics, with N being greater than one;

a controllable selector for selecting one of the N different antennas;

a detector for detecting through the selected antenna at least one interferer operating within the main band of frequencies;

a controller for controlling said controllable selector for selecting another antenna based on detecting the at least one interferer;

a processor for detecting at least a portion of said N antennas in which no interferer is detected, and for determining for each antenna in the at least a portion of said N antennas a bit error rate that is representative of a quality of the information exchange; and said controller selecting one of the antennas based on the determined bit error rates for continuing the information exchange.

9. A wireless device according to claim 8, further comprising a transmission chain and a reception chain; and wherein said controllable selector comprises a switch having N switching states respectively associated to said N antennas, the switch being configured in one of the N switching states upon reception of a control signal for connecting a corresponding antenna to either the transmission chain or the reception chain; and wherein said controller provides the control signal to said switch.

10. A wireless device according to claim 8, wherein said detector detects for an interferer for each newly selected antenna; and wherein said controller selects another antenna if an interfere is detected on the newly selected antenna.

11. A wireless device according to claim 8, wherein the antenna characteristics' comprise different antenna radiation pattern.

12. A wireless device according to claim 8, wherein the antenna characteristics comprise different antenna polarizations.

13. A wireless device according to claim 8, wherein the antenna characteristics comprise at least one of different antenna orientations and localization on each wireless device.

14. A wireless device according to claim 8, wherein the information being exchanged is based on an ultra wide band (UWB) multi-carrier based signal so that the wireless communication system comprises an orthogonal frequency-division multiplexing (OFDM) based UWB communication system; and wherein each wireless device comprises a UWB wireless device.

15. A wireless device according to claim 8, wherein the information being exchanged is based on an ultra wide band (UWB) multi-carrier based signal so that the wireless communication system comprises a direct sequence ultra wide band (DS-UWB) communication system; and
    wherein each wireless device comprises a DS-UWB wireless device.

16. A wireless communication system comprising:
    a plurality of wireless devices for exchanging information with one another, the information being exchanged within a main band of frequencies, each wireless device comprising
        N antennas having respectively different antenna characteristics, with N being greater than one,
        a controllable selector for selecting one of the N different antennas,
        a detector for detecting through the selected antenna at least one interferer operating within the main band of frequencies,
        a controller for controlling said controllable selector for selecting another antenna based on detecting the at least one interferer,
        a processor for detecting at least a portion of said N antennas in which no interferer is detected, and for determining for each antenna in the at least a portion of said N antennas a bit error rate that is representative of a quality of the information exchange, and
        said controller selecting one of the antennas based on the determined bit error rates for continuing the information exchange.

17. A wireless communication system according to claim 16, wherein each wireless device further comprises a transmission chain and a reception chain; and wherein said controllable selector comprises a switch having N switching states respectively associated to said N antennas, the switch being configured in one of the N switching states upon reception of a control signal for connecting a corresponding antenna to either the transmission chain or the reception chain; and wherein said controller provides the control signal to said switch.

18. A wireless communication system according to claim 16, wherein said detector detects for an interferer for each newly selected antenna; and wherein said controller selects another antenna if an interfere is detected on the newly selected antenna.

19. A wireless communication system according to claim 16, wherein the antenna characteristics comprise different antenna radiation pattern.

20. A wireless communication system according to claim 16, wherein the antenna characteristics comprise different antenna polarizations.

21. A wireless communication system according to claim 16, wherein the antenna characteristics comprise at least one of different antenna orientations and localization on each wireless device.

22. A wireless communication system according to claim 16, wherein the information being exchanged is based on ultra wide band (UWB) multi-carrier based signals so that the wireless communication system comprises an orthogonal frequency-division multiplexing (OFDM) based UWB communication system; and wherein each wireless device comprises a UWB wireless device.

23. A wireless communication system according to claim 16, wherein the information being exchanged is based on ultra wide band (UWB) multi-carrier based signals so that the wireless communication system comprises a direct sequence ultra wide band (DS-UWB) communication system;
    and wherein each wireless device comprises a DS-UWB wireless device.

* * * * *